Oct. 27, 1931.  E. J. SVENSON  1,829,619
CHUCK
Filed Oct. 5, 1927  2 Sheets-Sheet 1
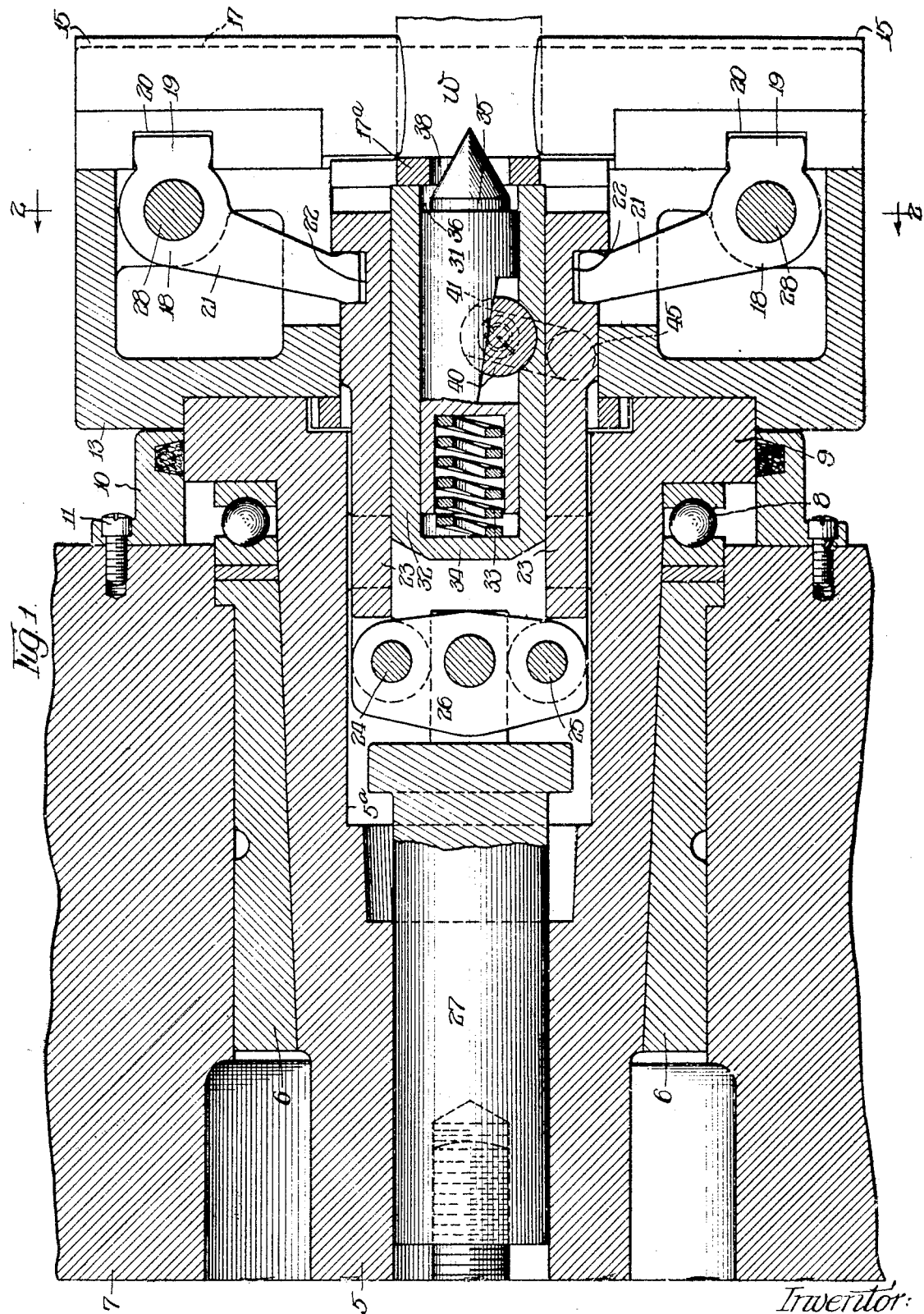

Oct. 27, 1931.  E. J. SVENSON  1,829,619
CHUCK
Filed Oct. 5, 1927    2 Sheets-Sheet 2
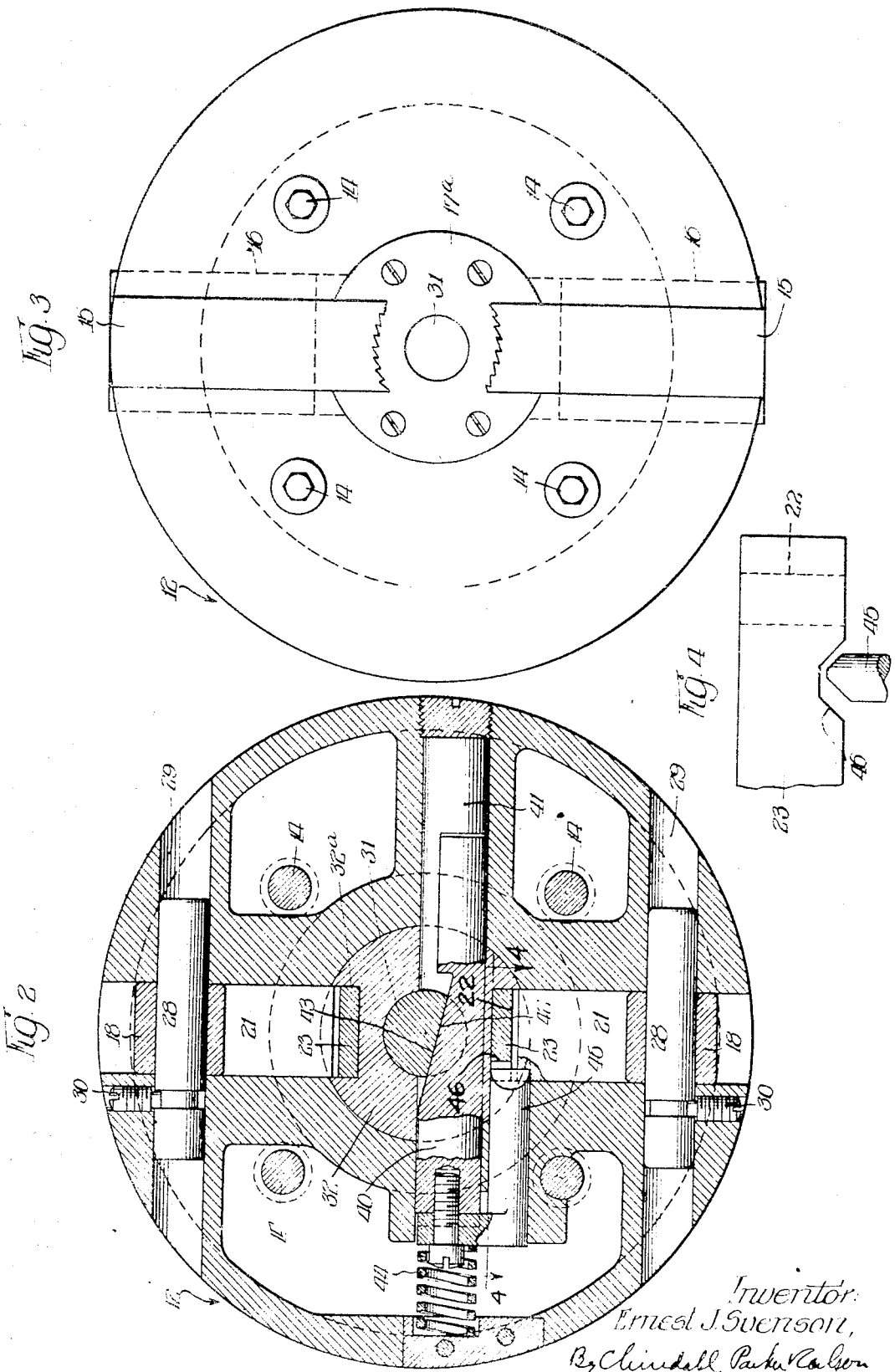
Inventor:
Ernest J. Svenson,
By Chindall Parker Carlson
Attys Patented Oct. 27, 1931

1,829,619

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

CHUCK

Application filed October 5, 1927. Serial No. 224,033.

My invention relates generally to lathe chucks and more particularly to drive chucks having radially movable work engaging chuck jaws.

The primary object of the invention resides in the provision of a lathe chuck operable quickly and accurately to position and clamp a work piece for rotation about a predetermined axis irrespective of slight irregularities in the surface of the work piece.

Another object is to provide a novel lathe chuck which will obviate the necessity for accurate positioning of the center hole in the work pieces.

A further object is to provide a chuck having a resiliently pressed cone center and means associated with the chuck jaw operating means operable automatically during the clamping of the chuck jaws to clamp the cone center against longitudinal movement.

Another object is to provide a chuck having a resilienty pressed cone center and means associated with the chuck jaw means operable during the clamping of the chuck jaws to urge the center firmly into the center hole of the work piece and to clamp it in such position.

In pursuance of the foregoing objects I aim to provide a lathe chuck having radially movable chuck jaws mounted on the chuck body, a resilient cone center pin, equalizing means for operating the chuck jaws whereby a work piece may be clamped with an equal force on both sides without a tendency to move said piece, and automatic means operable simultaneously with the clamping of the chuck jaw to clamp the cone center against longitudinal displacement.

Other objects and advantages will become apparent from the following description and from the accompanying drawings in which:

Figure 1 is a fragmentary central sectional view taken longitudinally of a lathe spindle and chuck which embodies the invention.

Fig. 2 is a sectional view of the chuck shown in Fig. 1 taken along the line 2—2.

Fig. 3 is a front elevational view of the chuck shown in Fig. 1.

Fig. 4 is an enlarged fragmentary view taken along the line 4—4 of Fig. 2.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the embodiment chosen for disclosure herein a tubular spindle 5 is shown rotatably mounted in a bearing 6 of a lathe frame 7 and has suitable end thrust bearings 8 interposed between the end of the bearing 6 and an abutment formed by an outwardly extending flange 9 formed at the end of the spindle 5. An annular guard ring 10 is herein shown surrounding the bearing 8, fastened to the frame 7 by tap screws 11 and extending longitudinally of the spindle to fit around the periphery of the flange 9, thus serving to protect the bearings 6 and 8.

A main chuck body or head 12 is positioned at the forward end of the spindle 5 coaxial therewith and secured thereto by any preferred means. As herein shown the chuck body 12 has an annular flange 13 extending axially therefrom adapted to surround the periphery of the flange 9 on the spindle 5 thus definitely positioning the chuck body 12 thereon. Suitable fastening means is provided such as tap screws 14 (Fig. 3) extending through bores in the chuck body and engaging the spindle 5.

The end of the chuck body 12 opposite the flange 9 has a pair of work engaging chuck jaws 15 mounted in opposed relation thereon for movement radially thereof. As herein illustrated, the jaws 15 are slidably mounted in radially extending T-slots 16 formed in the forward face 17 of the chuck body.

Means is provided for moving the jaws 15 radially of the chuck body 12 so as to clamp or unclamp a work piece W placed against the face of chuck in contact with an apertured gauge plate 17ª attached to the face of the chuck body. In the present embodiment this means comprises a pair of bell crank levers 18, one for each of the jaws 15, mounted in the chuck body 12 for oscillation in a radial plane and having one arm 19 thereof engaging a transverse slot 20 formed in the chuck jaw 15. The other arms 21 of the bell cranks 18 extend toward the axis of the chuck to engage in transverse slots 22 formed in members 23 mounted in the chuck body for sliding movement longitudinally of the chuck. The members 23 extend into the bore 5ª of the spindle 5 and are pivotally connected at 24 and 25 to opposite ends of an equalizing bar 26 which is in turn pivotally connected at its midpoint to an axially slidable member 27 mounted within the spindle and arranged to be reciprocated by any preferred means (not shown). Thus when the member 27 is moved by an actuating means the chuck jaws 15 may be clamped to or unclamped from a work piece according to the direction of movement of the member 27.

To provide for convenient insertion of chuck jaws of different sizes, the bell cranks 18 are preferably arranged so that they may be easily moved out of engagement with the grooves 20 in the jaws 15. To this end the bell cranks 18 are mounted on pivot pins 28 removably secured in bores 29 by set screws 30.

In its preferred form it is contemplated that the invention will be used in connection with a movable tail stock center (not shown); that work pieces which have previously had end center holes formed therein will be centered and clamped in the chuck for rotation about the axis determined by the center holes; and that the work will be gauged from a part definitely located with respect to the lathe chuck, for example, the gauge plate 17ª, thereby making it necessary not only to clamp the work for rotation about a predetermined center, but also to clamp it while in firm contact with the gauge plate.

The provision of an equalizing means for operating the chuck jaws 15 makes it possible to clamp a work piece which is located eccentrically of the chuck by exerting an equal force on each side of the piece without a tendency to shift the piece from its eccentric position. Thus when a work piece is positioned eccentrically of the chuck due to an eccentric location of the center hole, the piece will be effectively clamped by the jaws without moving it from the position determined by the center hole.

In order that such a firm and definite contact may be readily secured between a work piece and the gauge plate 17ª, irrespective of the depth of the center hole, a cone center pin 31 is provided which is mounted for sliding movement axially of the chuck in a sleeve 32 which is secured in the chuck body 12. The sleeve 32 has longitudinal slots 32ª formed exteriorly thereof in which the members 23 are slidably mounted. A coil spring 33 is mounted in the sleeve 32 so as to abut a rear end wall 34 of the sleeve 32 and the rear end of the center pin, thus serving to urge the center pin 31 outwardly of the chuck and into contact with the work piece W.

In the present instance the center pin 31 has a reduced portion 35 leaving a shoulder 36 thereon which is adapted to abut a gauge plate 17ª on the chuck to limit the movement of the pin 31 outwardly thereof, the reduced portion 35 of the pin extending through an aperture 38 formed in the gauge plate.

In the performance of a normal chucking operation of a work piece having end center holes formed therein, the piece is placed between the jaws 15 with the center hole over the point of the cone center, and is moved into firm contact with the gauge plate 17ª by pressure exerted on the other end of the piece by the tail stock (not shown). The jaws 15 are then clamped upon the piece by moving the member 27 to the left in Fig. 1 thus moving the equalizing bar 26, the slide members 23, and rocking the bell cranks 18 so as to move the jaws 15 toward the work piece. If it so happens that the center hole is eccentric of the piece, one of the jaws 15 will strike one surface of the work piece before the other, and upon its being stopped, the entire movement of the member 27 will be transmitted to the other of the jaws 15 until it also contacts the work piece, whereupon the piece will be clamped between the jaws without moving the piece from the eccentric position determined by the position of the center hole therein.

Means is provided to fix the jaws and the work piece in the position in which the piece is clamped, this means preferably including the center pin and comprising in the present instance means for giving the center pin 31 an additional thrust into the center hole after the work piece W is clamped between the chuck jaws 15 and to clamp the pin in that position while the jaws remain in clamped position. In the preferred embodiment of the invention this means is operatively associated with the chuck jaw operating means and comprises generally a locking member 40 slidably mounted in a transverse bore 41 formed in the chuck body near the axis thereof. Opposed cam surfaces 42 and 43 are formed on the locking member 40 and the center pin 31 respectively so that upon movement of the member 40 transversely of the chuck through the bore 41 the cam surfaces 42 and 43 will engage and tend to urge the center pin 31 outwardly of the chuck and to clamp it against the opposite side wall of the sleeve 32. The engagement of the cam surfaces will of course resist any backward movement of the center pin 31, thus locking the pin in the desired position. In the embodiment illustrated the locking member 40 is normally pressed into operative relation with the center pin 31 by means of an expansive coil spring 44 attached to one end of the member 40 and abutting the outer wall of the chuck.

To release the center pin 31 for outward sliding movement before the jaws are clamped, a pin member 45 or other suitable projection is rigidly attached to the locking member and arranged to engage a cam surface 46 (see Fig. 4) on one of the slide members 23 so that when the slide member 23 is moved to unclamp the jaws 15, the member 40 is moved against the action of the spring 44 and the cam surfaces 42 and 43 are disengaged.

Thus it will be apparent that during the initial part of the chucking operation the center pin will be urged into the center hole in the work piece by the force of one spring, which may of course be made of any reasonable or desirable strength, and that after the work has been clamped in the jaws the center pin will be urged into the center hole by another force of any desired amount so as to positively center the work piece for rotation about the desired axis.

It will be apparent that the invention provides a device having a cone center which is automatically and positively clamped in its operative position while the chuck jaws are clamped, and in which a work piece may be quickly and accurately clamped for rotation in its centered position irrespective of slight irregularities in the surface of the work piece.

I claim as my invention:

1. A lathe chuck comprising a rotatable chuck body, a pair of opposed chuck jaws mounted externally of said body and movable radially thereof, a pair of bell cranks mounted in said body and having one arm of each engaging one of said jaws, and the other arm of each extending radially inwardly of said chuck body, a pair of members mounted for longitudinal slidable movement in said body on opposite sides of the axis thereof, each of said members engaging the radially extending arm of one of said bell cranks, an equalizing bar pivotally connecting said members, an operating means pivoted to said bar midway between said members, a longitudinally slidable center pin mounted in said body axially thereof and between said members, spring means urging said center pin outwardly of said body, spring pressed cam means operable to engage said pin to lock the same against movement, and a cam surface associated with said operating means and operable to engage said cam means to render said cam means inoperative when said chuck jaws are unclamped.

2. In a lathe chuck having a pair of radially movable opposed jaws and a resiliently pressed cone center, means for moving said jaws comprising a pair of bell crank levers mounted in said chuck and each having one arm engaging one of said jaws, a link connected to each of the other arms of said bell cranks and extending longitudinally of said chuck, a bar having one of its ends pivotally connected to each of said links, means pivotally connected to the center of said bar for moving it longitudinally of said chuck, and means associated with one of said links operable to clamp said cone center against longitudinal movement.

3. The combination with a lathe chuck having a resilient cone center arranged to permit a work piece to be positioned and clamped in predetermined axial relation to the chuck, jaws for clamping work mounted on said center and operating means for said jaws, of means operable by said operating means effective to urge said cone center into firm contact with a work piece during the clamping of said piece in said jaws and then to clamp said cone center in such contact.

4. A lathe chuck having chuck jaws, a center pine movable longitudinally of the chuck independently of the jaws when said jaws are unclamped, resilient means for pressing said pin outwardly of said chuck, means for clamping said jaws on a work piece, and means associated with the last said means and operable thereby for clamping said center pin against longitudinal displacement.

5. A lathe chuck having longitudinally movable center pin, resilient means for pressing said pin toward the work piece, a pair of radially movable opposed chuck jaws, equalizing means for clamping said jaws upon a work piece, a cam member for urging said center pin outwardly of said chuck and for clamping said pin in such position, said member being mounted transversely within said chuck and adjacent said center pin, resilient means urging said cam member into operative relation with said center pin, and means operable to control the operation of said cam member.

6. In a lathe chuck, the combination of radially movable chuck jaws, equalizing operating means for said jaws, a spring pressed center pin, locking means for said center pin, and means associated with said chuck jaw operating means to control the operation of said locking means according to the position of said chuck jaws.

7. In a lathe chuck, the combination, of radially movable chuck jaws, equalizing operating means therefor, a yieldable cone center, means for locking said center against longitudinal displacement, and control means for said locking means associated with and operable by said chuck jaw operating means.

8. A lathe chuck comprising a rotatable chuck body, a pair of opposed chuck jaws mounted externally of said body and movable radially thereof, a pair of bell cranks mounted in said body and having one arm of each engaging one of said jaws and the other arm of each extending from its pivot radially inwardly of said chuck body, a pair of members mounted for longitudinal slidable movement in said body on opposite sides of the axis thereof, each of said members engaging the radially extending arm of one of said bell cranks, an equalizing bar pivotally connecting said members, and operating means pivoted to said bar midway between said members.

9. The combination with a lathe chuck having a resiliently pressed cone center movable longitudinally of the chuck, of means for locking said center against longitudinal displacement in any position lying within its normal range of movement, and a member longitudinally slidable within said chuck and operable to control said locking means.

10. A lathe chuck comprising, in combination, a chuck body, an apertured gauge plate mounted on said body, a yieldable cone center reciprocably mounted in said body and adapted to extend through said aperture, means operable to lock said center against displacement, radially movable chuck jaws mounted on said body, equalizing operating means for said jaws, and means associated with said chuck jaw operating means for controlling the operation of said locking means.

11. A lathe chuck comprising, in combination, a chuck body, a cone center mounted for longitudinal movement therein, chuck jaws, equalizing means for clamping said jaws on a work piece, and automatic locking means operable simultaneously with the clamping of said jaws to lock said cone center against longitudinal displacement.

12. A lathe chuck comprising a chuck body, means mounted thereon for engaging a work piece to drive the same, an apertured gauge plate mounted on the face of said body, a yieldable cone center adapted to be pressed through the aperture in said plate and into contact with a work piece, and cam means for locking said cone center against longitudinal displacement.

13. A lathe chuck comprising, a chuck body, radially movable chuck jaws mounted therein, equalizing operating means for said jaws whereby a work piece may be clamped on the face of said chuck eccentrically thereof, and means for securing said jaws against movement from such eccentric position operable after the clamping of the work piece therein.

14. The combination with a lathe chuck having a yieldable cone center, of locking means associated with said center and operable to urge said center slightly forward and secure it against longitudinal displacement, and a member mounted for movement longitudinally of said chuck body and operable to control said locking means.

15. In a lathe chuck adapted to clamp work located eccentrically of the chuck, the combination of a chuck body, opposed chuck jaws mounted thereon, a member mounted for movement longitudinally of said chuck, an equalizing bar having its midpoint pivotally attached to said member, means connecting the ends of said bar to the chuck jaws operable by longitudinal movement of said member to clamp said jaws, and means operable after the clamping of the jaws for securing said jaws and the work against movement laterally of the chuck, said means including a longitudinal movable center pin mounted on said chuck body and adapted to engage the work.

16. A lathe chuck comprising, in combination, a rotatable chuck body, clamping means movable radially of said body to form a driving connection with a work piece positioned eccentrically of the chuck body for rotating the work piece with said chuck body, means movable axially of said body independently of said clamping means while said clamping means is unclamped so as to permit a work piece to be positioned in definite predetermined axial relation to said chuck body and operable to position such a work piece for rotation about a definite predetermined axis in said work piece, means for clamping said last mentioned means in fixed axial position, and means operable to actuate both of said clamping means in timed relation to each other.

17. A chuck having, in combination, a body, chuck jaws movably mounted thereon, a cone center slidable axially on said body, resilient means normally urging said cone center toward a work piece mounted between said jaws, and means for clamping said center in its operative position comprising a member slidable transversely of said center, said center and member having corresponding beveled surfaces engageable by moving said member, said surfaces being inclined longitudinally of the center so that when said member is wedged against the center it tends to move the center longitudinally toward the work.

18. A chuck having, in combination, a body, chuck jaws movably mounted thereon, a cone center slidable axially on said body, and means for clamping said center in its operative position comprising a member slidable relatively to said center, said center and member having corresponding beveled surfaces engageable by moving said member, said surfaces being inclined so that when said member clamps the center it tends to move the center longitudinally toward the work.

19. A chuck comprising, in combination, a chuck body, a gauge abutment on said body against which one end of a work piece may be positioned, chuck jaws mounted on said body, a center slidable axially of said body and arranged to engage the end of the work piece to center it, equalizing operating means for clamping said jaws onto the centered work piece, and means operable to lock said center against the end of the work piece.

20. A chuck having, in combination, a body, chuck jaws movably mounted thereon, a center slidable axially on said body and arranged to center a work piece, means for clamping said jaws onto the work piece without disturbing the centered position thereof, an abutment for the adjacent end of the work, resilient means normally urging said center against a work piece mounted between said jaws and with one end against said abutment, and means for clamping said center in its work engaging position.

21. A chuck having, in combination, a body, chuck jaws movably mounted thereon, equalizing means for clamping said jaws on a work piece, a center slidable axially on said body and arranged to center the work piece, and means for clamping said center in its operative position comprising an adjustable member, said center and member having corresponding interengaging surfaces engageable by moving said member, said surfaces being inclined transversely and longitudinally of the center so that when said member is wedged against the center it tends to move the center longitudinally toward the work.

In testimony whereof, I have hereunto affixed my signature.

ERNEST J. SVENSON.